(12) United States Patent
Mooney

(10) Patent No.: US 10,974,628 B1
(45) Date of Patent: Apr. 13, 2021

(54) APPARATUS FOR PROVIDING A CAR SEAT WITH VENTILATION

(71) Applicant: Joseph Patrick Mooney, Merritt Island, FL (US)

(72) Inventor: Joseph Patrick Mooney, Merritt Island, FL (US)

( * ) Notice: Subject to any disclaimer, the term of this patent is extended or adjusted under 35 U.S.C. 154(b) by 296 days.

(21) Appl. No.: 16/223,890

(22) Filed: Dec. 18, 2018

(51) Int. Cl.
    *B60N 2/56* (2006.01)
    *B60N 2/28* (2006.01)
    *B60N 2/26* (2006.01)

(52) U.S. Cl.
    CPC ............ *B60N 2/5628* (2013.01); *B60N 2/28* (2013.01); *B60N 2/5657* (2013.01); *B60N 2/26* (2013.01)

(58) Field of Classification Search
    CPC .................................................... B60N 2/5628
    USPC .................................................... 297/180.11
    See application file for complete search history.

(56) References Cited

U.S. PATENT DOCUMENTS

| | | | |
|---|---|---|---|
| 2,158,801 A | 5/1939 | Peterson | |
| 2,791,956 A | 5/1957 | Guest | |
| 2,826,135 A | 3/1958 | Benzick | |
| 2,931,286 A * | 4/1960 | Fry, Sr. ................ | B60N 2/5628 454/120 |
| 3,101,660 A * | 8/1963 | Taylor .................. | B60N 2/5657 454/120 |
| 5,016,302 A * | 5/1991 | Yu ........................ | B60N 2/5628 297/180.11 |
| 5,626,387 A * | 5/1997 | Yeh ...................... | B60N 2/5628 297/180.11 |
| 5,918,930 A * | 7/1999 | Kawai .................. | B60N 2/5628 297/180.13 |
| 5,921,858 A * | 7/1999 | Kawai .................. | B60N 2/5628 454/120 |
| 6,062,641 A | 5/2000 | Suzuki et al. | |
| 6,079,781 A | 6/2000 | Tilley | |
| 6,843,717 B1 | 1/2005 | Bennett | |
| 7,261,371 B2 | 8/2007 | Thunissen et al. | |
| 7,467,823 B2 | 12/2008 | Hartwich | |
| 7,607,739 B2 | 10/2009 | Browne et al. | |
| 7,828,050 B2 | 11/2010 | Esaki | |
| 10,252,645 B1 * | 4/2019 | Peterson ................. | B60N 2/28 |
| 2003/0102699 A1 | 6/2003 | Aoki et al. | |
| 2004/0113468 A1 | 6/2004 | Swanson et al. | |
| 2005/0082885 A1 | 4/2005 | Thunissen et al. | |
| 2005/0243331 A1 | 11/2005 | Ishima et al. | |
| 2006/0130490 A1 | 6/2006 | Petrovski | |
| 2006/0214480 A1 | 9/2006 | Terech | |
| 2008/0290702 A1 | 11/2008 | Shin | |

(Continued)

FOREIGN PATENT DOCUMENTS

| DE | 202013102443 U1 | 7/2013 |
|---|---|---|
| KR | 101483867 B1 | 1/2015 |

*Primary Examiner* — David R Dunn
*Assistant Examiner* — Tania Abraham
(74) *Attorney, Agent, or Firm* — Simpson & Simpson PLLC

(57) ABSTRACT

A seat adapter arranged to be secured to a rear surface of a car seat having one or more holes, the seat adapter including a plate, including a first surface arranged to be secured to the rear surface, a second surface, and one or more perforations operatively arranged to create one or more breakaway sections, a first section extending from the second surface, and a through-hole extending through the plate and the first section, the through-hole arranged to be at least partially aligned with one of the one or more holes.

20 Claims, 6 Drawing Sheets

(56) References Cited

U.S. PATENT DOCUMENTS

2017/0015226 A1   1/2017  Wolas
2017/0080837 A1   3/2017  Cho et al.
2019/0160986 A1*  5/2019  Tsai .................... B60N 2/5628

* cited by examiner

APPARATUS FOR PROVIDING A CAR SEAT WITH VENTILATION

FIELD

The present disclosure relates to the field of heating, ventilation, and air conditioning in vehicles, and more particularly, to an apparatus that provides a car seat with heating, ventilation, and air conditioning.

BACKGROUND

Child car seat apparatuses, often used in standard vehicle seats, are small seats usually made of hard plastic covered in a padded fabric covering and equipped with straps and buckles to secure a child in the vehicle. Child car seats are usually used to ensure the safety of a child by restricting the movement of the child within the vehicle and providing a restraint that is fitted to the smaller physical size of a child. Child car seats are also designed to provide for specific positioning of the child within the vehicle such that the child's safety is maximized in the event of a vehicle collision. There are many variations of this apparatus currently on the market for purchase, and parents or other consumers often put a lot of research and thought into the choice of a specific model of car seat for a child.

While recent car seats show improvements for both the safety and comfort of the child occupant, the car seat can still become uncomfortable for the child during a long drive. On a car trip which requires more time in the vehicle, restriction of the car seat's straps restrict movement so as to force the child to sit in substantially the same position for long periods of time, which generates heat and discomfort. The padding of a car seat can contribute to this heat discomfort, especially over these long drives. While modern vehicles usually have built-in heating, ventilation, and air conditioning (HVAC) capabilities, the car seat's proper installation position is usually far away from the vehicle's vents, and there are currently no ways to exploit the vehicle's cooling system to cool an existing child's car seat.

Thus, there has been a long felt need for a child car seat having a device to provide cooling and/or heating to the car seat using the vehicle's existing HVAC capabilities.

SUMMARY

According to aspects illustrated herein, there is provided a seat adapter arranged to be secured to a rear surface of a car seat having one or more holes, the seat adapter comprising a plate, including a first surface arranged to be secured to the rear surface, a second surface, and one or more perforations operatively arranged to create one or more breakaway sections, a first section extending from the second surface, and a through-hole extending through the plate and the first section, the through-hole arranged to be at least partially aligned with one of the one or more holes.

According to aspects illustrated herein, there is provided a HVAC device arranged to direct air flow from a vehicle vent, the HVAC device comprising a seat adapter, including a plate, including a first surface, a second surface, and one or more perforations operatively arranged to create one or more breakaway sections, a first section extending from the second surface, the first section forming a first inlet, and a through-hole extending through the plate and the first section, a hose including a first end connected to the inlet and a second end, and a vent adapter including a second inlet operatively arranged to be secured to the vehicle vent and an outlet connected to the second end.

According to aspects illustrated herein, there is provided a HVAC device arranged to direct air flow from a vehicle vent, the HVAC device comprising a car seat comprising a rear surface including one or more holes, a seat adapter, comprising a plate, including a first surface arranged to be secured to the rear surface, a second surface, and one or more perforations operatively arranged to create one or more breakaway sections, a first section extending from the second surface, the first section forming a first inlet, and a through-hole extending through the plate and the first section, the through-hole arranged to be at least partially aligned with one of the one or more holes, a hose including a first end connected to the inlet and a second end; and, a vent adapter including a second inlet operatively arranged to be secured to the vehicle vent and an outlet connected to the second end.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
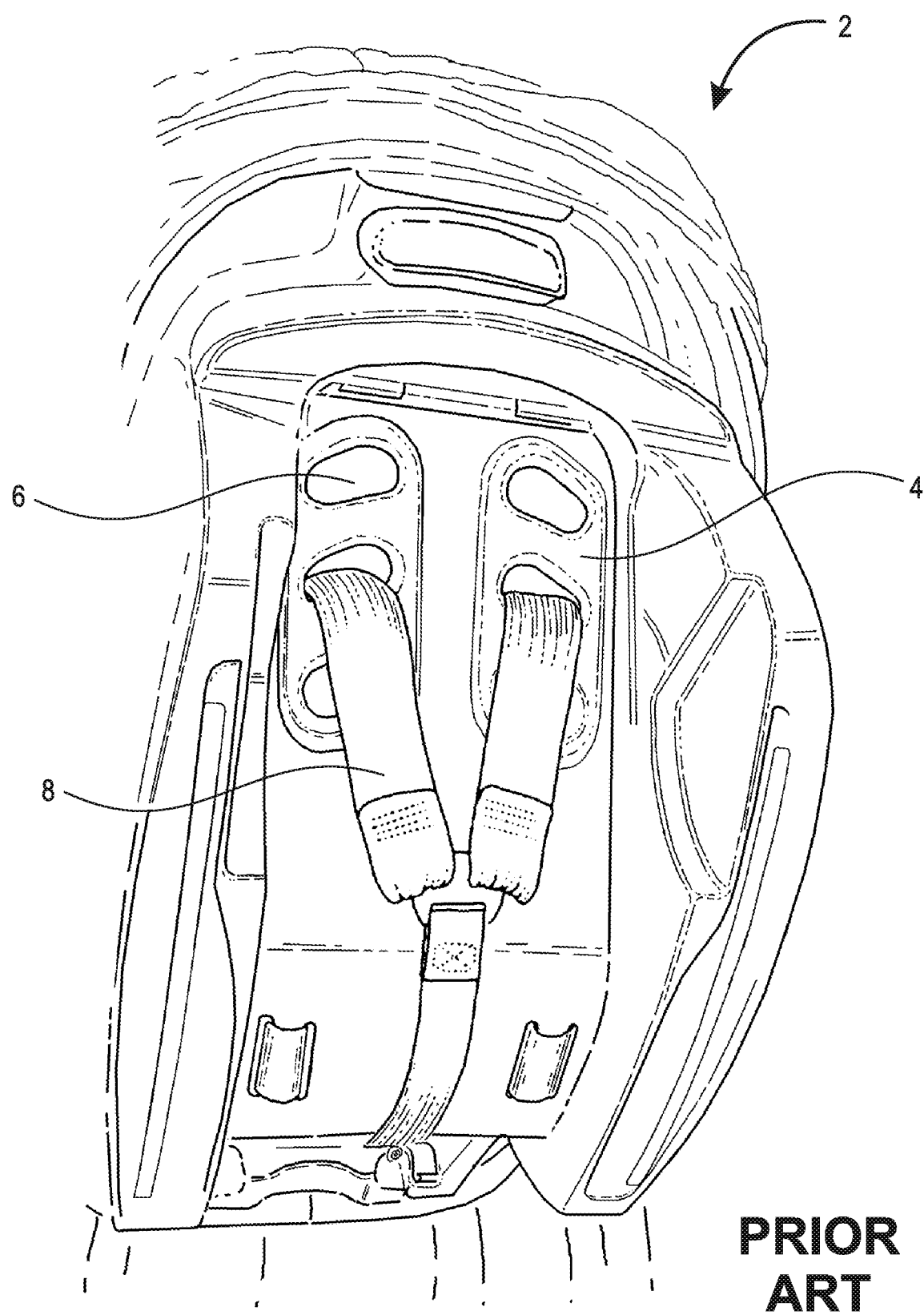
FIG. 1 is a rear perspective view of a prior art car seat.

Referring now to the figures, FIG. 1 is a rear perspective view of prior art car seat 2. Car seat 2 generally comprises rear surface 4, one or more holes 6, and one or more seat belts 8. Car seat 2 is a standard child car seat as is known in the art. Child car seats are typically secured in the backseat of a vehicle and face the rear of the vehicle. As shown, rear surface 4 faces the front of the vehicle, and one or more holes 6 are exposed. Holes 6 allow seat belt 8 to extend from rear surface 4 to the front of car seat 2 to secure the child thereto. Many times child car seats come with a plurality of holes such that seat belt 8 can be adjusted for different size children. For example, an infant may use a seat belt which extends through the bottom two holes, whereas a toddler is taller and may use the top two holes. These holes will provide the necessary access point to the child for HVAC device 30, as is discussed in greater detail below.

Figure 2:
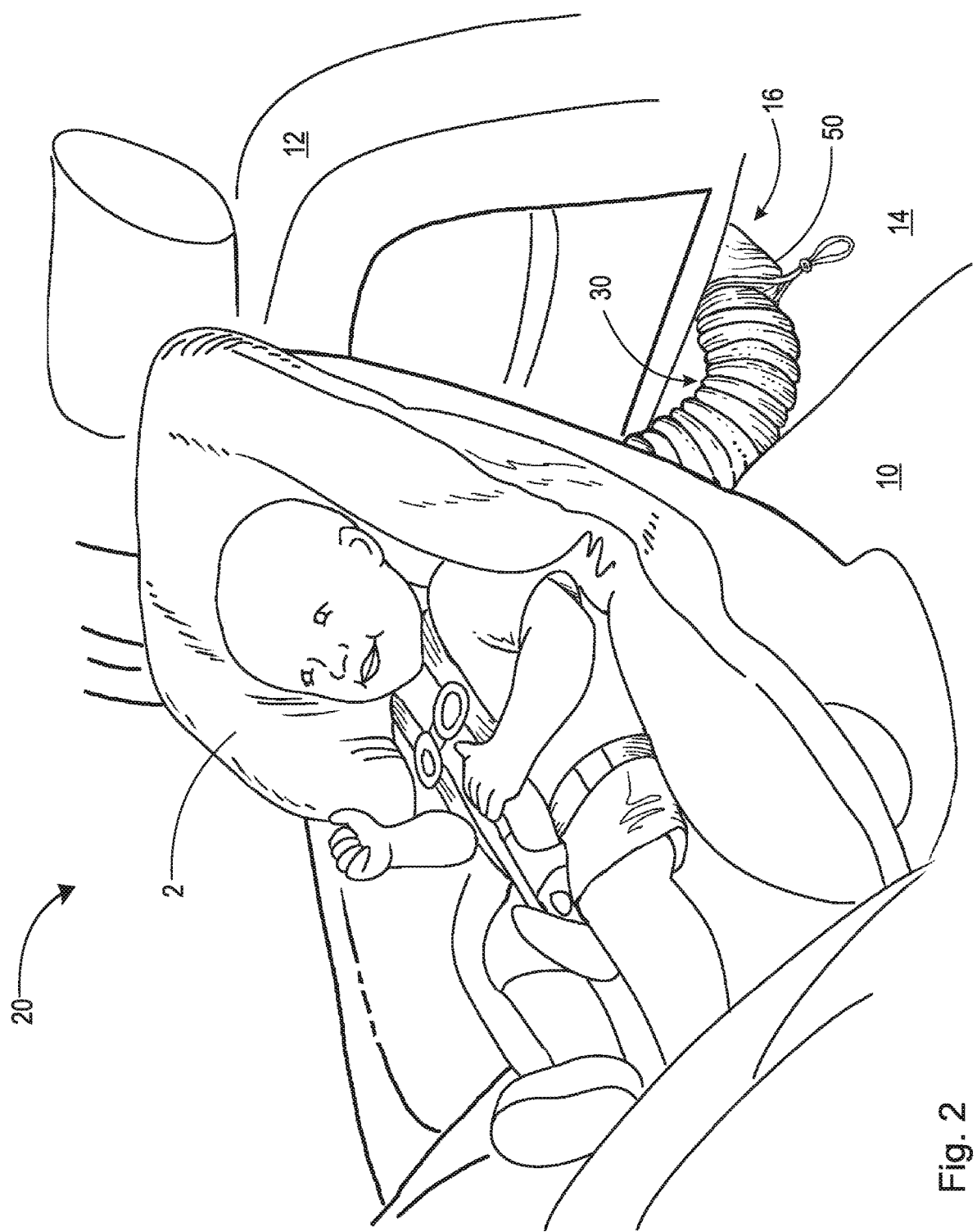
FIG. 2 is a front perspective view of an HVAC car seat assembly.
Figure 3:
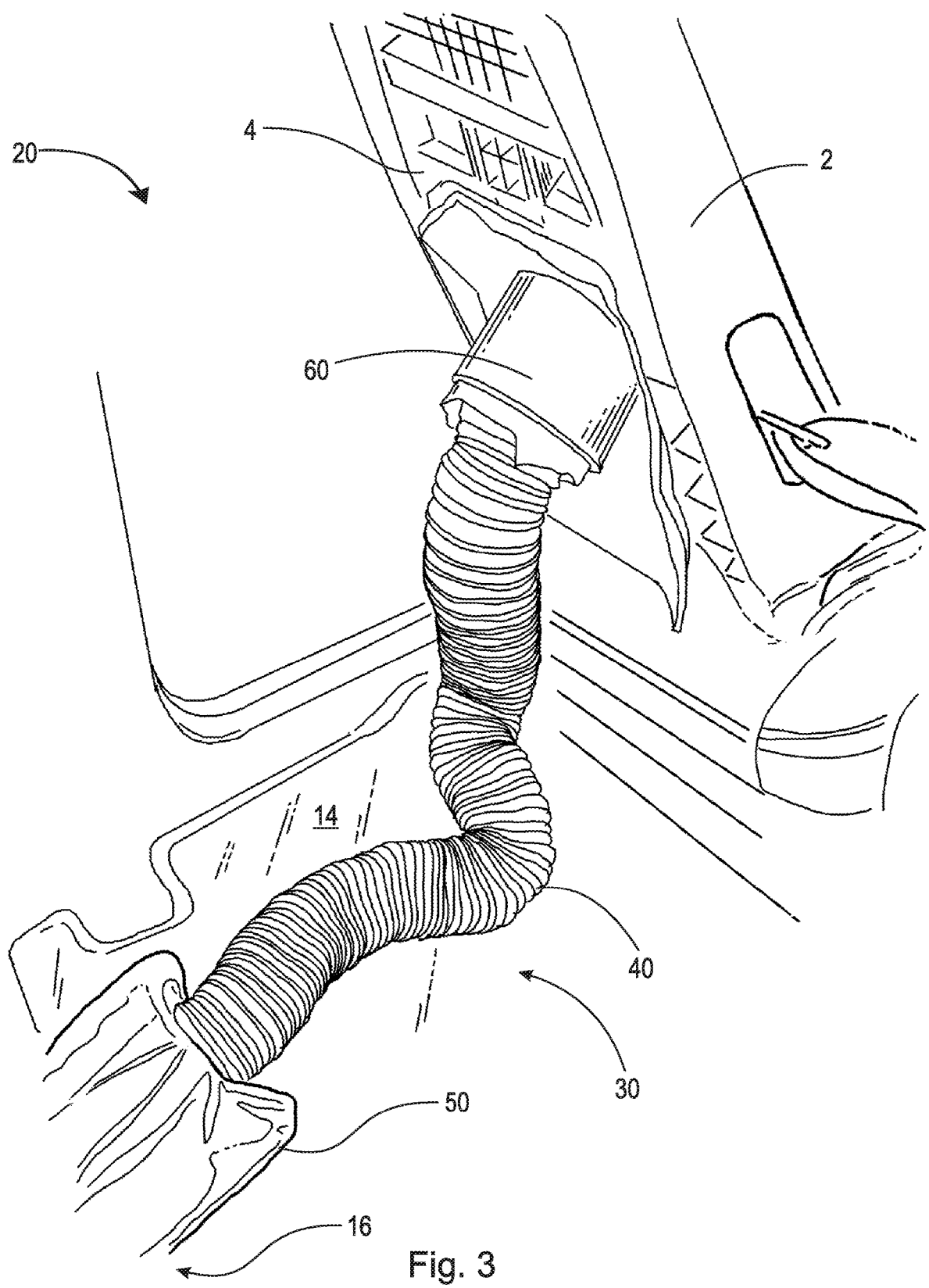
FIG. 3 is a front perspective view of the HVAC car seat assembly shown in FIG. 2.

FIG. 2 is a front perspective view of HVAC car seat assembly 20. FIG. 3 is a front perspective view of HVAC car seat assembly 20. HVAC car seat assembly 20 generally comprises car seat 2, vehicle vent 6, and HVAC device 30. The following description should be read in view of FIGS. 2 and 3.

As previously discussed, car seat 2 is secured to vehicle rear seat 10 facing the rear of the vehicle. This arrangement exposes rear surface 4 of car seat 2 to the front of the vehicle, for example, toward vehicle front seat 12. Vehicle vent 16 is generally positioned on or in vehicle floor 14, and under vehicle front seat 12. HVAC device 30 is arranged to connect car seat 2 with vehicle vent 16. It should be appreciated that HVAC device 30 is arranged to connect to any suitable vent within the vehicle (e.g., a vent in the door or center console).

Figure 4:
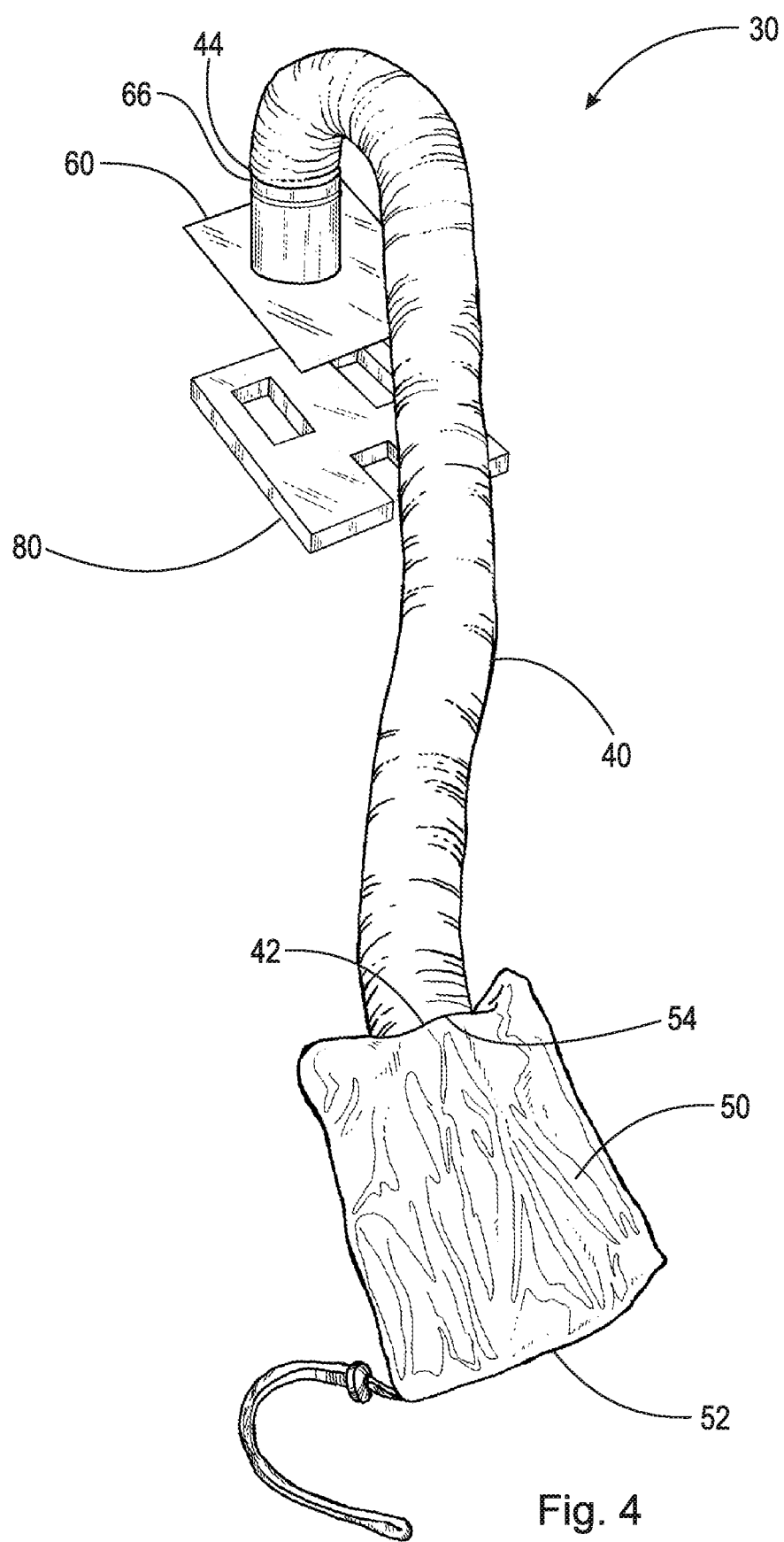
FIG. 4 is a perspective view of an HVAC device.
Figure 5:
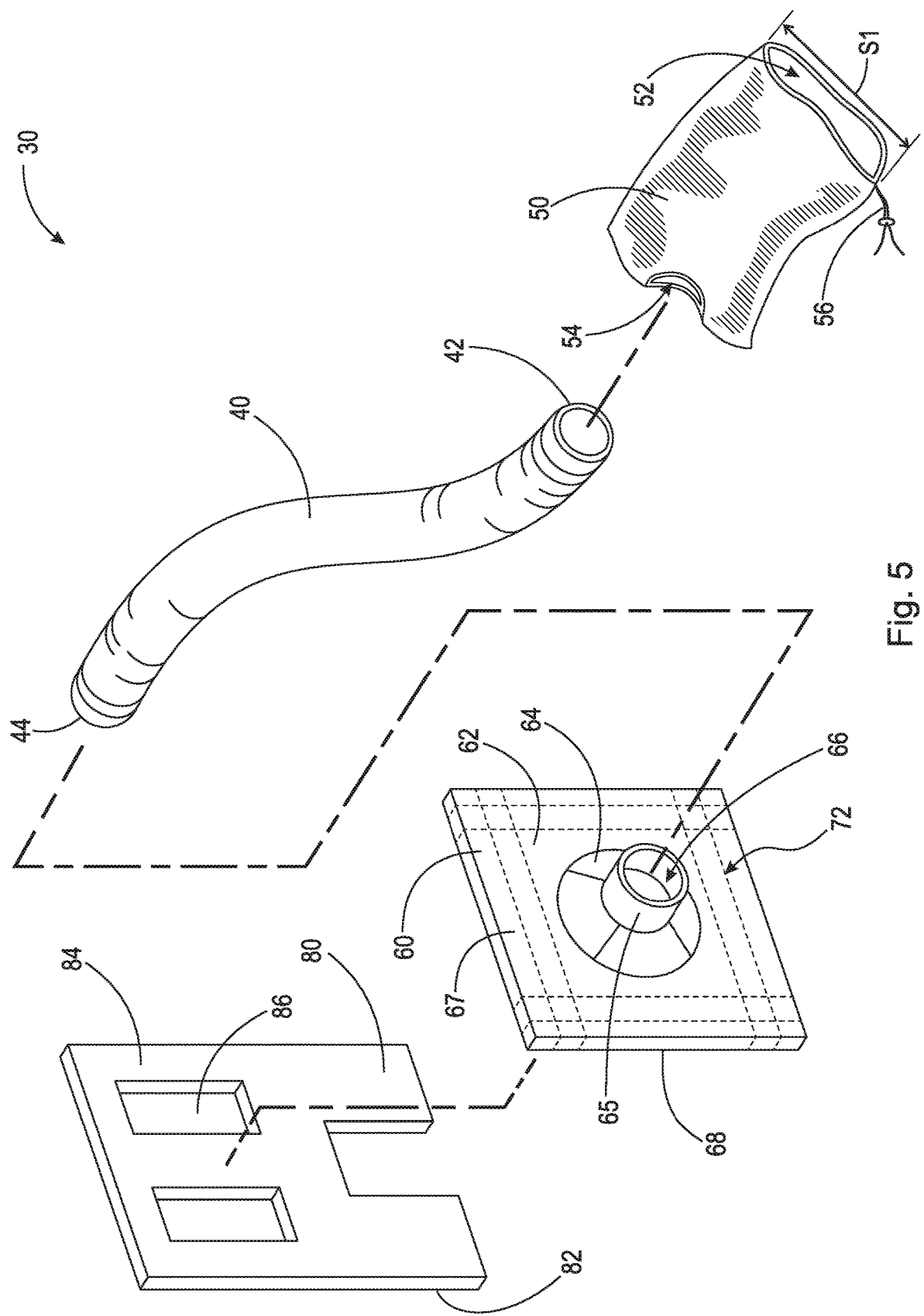
FIG. 5 is a front exploded perspective view of the HVAC device shown in FIG. 4.
Figure 6:
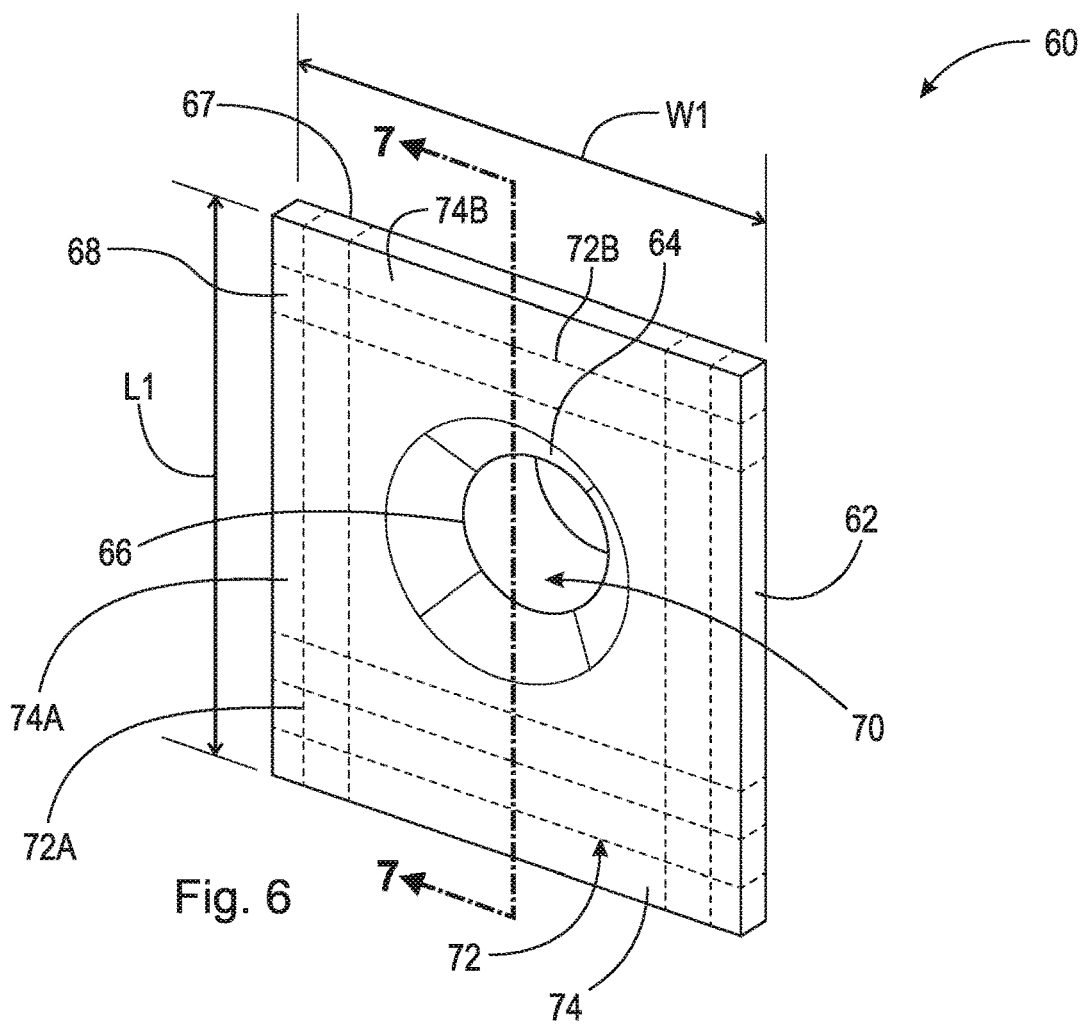
FIG. 6 is rear perspective view of a seat adapter as shown in FIG. 5; and, FIG. 7 is a cross-sectional view of the seat adapter taken generally along line 7-7 in FIG. 6.
Figure 7:
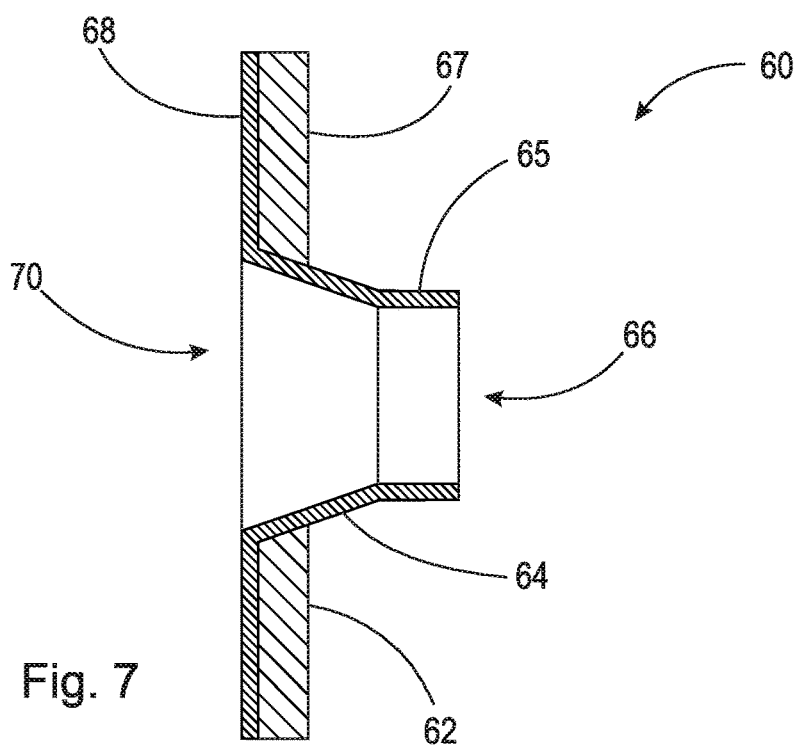

FIG. 4 is a perspective view of HVAC device 30. FIG. 5 is a front exploded perspective view of HVAC device 30. FIG. 6 is rear perspective view of seat adapter 60. FIG. 7 is a cross-sectional view of seat adapter 60 taken generally along line 7-7 in FIG. 6. HVAC device 30 generally comprises hose 40, vent adapter 50, and seat adapter 60. In some embodiments, HVAC device 30 further comprises spacer or seal 80. The following description should be read in view of FIGS. 2-7.

Hose 40 is a tube comprising end 42 and end 44. End 42 is arranged to be connected to vehicle vent 16 via vent adaptor 50. End 44 is arranged to be connected to car seat 2 via seat adapter 60. In some embodiments, hose 40 is flexible. In some embodiments, hose 40 is rigid. In some embodiments, hose 40 is partially rigid and partially flexible. In some embodiments, hose 40 is flexible with the ability to retain its shape after it's deformed, for example, like a gooseneck microphone or gooseneck microphone stand.

Vent adapter 50 comprise inlet 52 and outlet 54. Inlet 52 is operatively arranged to be removeably secured to an air input, such as vehicle vent 16. In some embodiments, vent adapter 50 comprises a flexible airtight material such that outlet 54 can take the shape of, and be connected to, an air input of any shape or type. As shown, vent adapter 50 may comprise adjuster 56, which is operatively arranged to adjust size S1 of inlet 52. For example, inlet 52 may be fitted around vehicle vent 16 and adjuster 56 is used to secure or clamp inlet 52 therearound. Adjuster 56 may be any device suitable for clamping vent adapter 50 to vehicle vent 16, such as, a draw string, a pipe clamp, tape, adhesives, solder, etc. In some embodiments, vent adapter 50 is rigid. In some embodiments, vent adapter 50 is secured to vehicle vent 16 via a threaded connection. Outlet 54 is arranged to be connected to end 42 of hose 40 via any suitable means, for example, solder, adhesives, welding, threaded connection, etc. In some embodiments, vent adapter 50 is an air tight bag that fits over vehicle vent 16 and is tightly sealed therearound via adjuster 56.

Seat adapter 60 generally comprises plate 62, section 64, section 65, and hole 70. Plate 62 comprises surface 67, surface 68, and plurality of perforations 72. Section 64 is connected to plate 62 and extends from surface 67. In some embodiments, section 64 is frusto-conical. In some embodiments, section 64 is cylindrical. Section 65 is connected to and extends from section 64. In some embodiments, section 65 is cylindrical. In some embodiments, section 65 is frusto-conical. Section 65 is operatively arranged to be connected to end 44 of hose 40 via any suitable means, for example, solder, adhesives, welding, threaded connection, etc. Hole 70 extends through plate 62, section 64, and section 65. Plurality of perforations 72 are arranged on plate 62 to create plurality of break-away sections 74. Such design allows for plate 62 to be modified to fit car seats of various sizes and shapes. For example, if width W1 of plate 62 is too wide to fit on rear surface 4 of car seat 2, then break-away section 74A can be removed or folded away from plate 62 about perforation 72A to reduce width W1. Similarly, if length L1 of plate 62 is too long to fit on rear surface 4 of car seat 2, then break-away section 74B can be removed from plate 62 about perforation 72B to reduce length L1. It should be appreciated that, although perforations 72 are only shown as linear perforations arranged vertically and horizontally, plate 62 may comprise any number and arrangement of perforations suitable to be adjustable to fit any number of car seats and this disclosure should not be limited to the arrangement of perforations shown. For example, one or more perforations 72 may be curvilinear. In some embodiments, plate 62 comprises perforations about its corners to create chamfers (with angled linear perforations) or fillets (with curvilinear perforations) thereon. Seat adapter 60 is arranged to be connected to car seat 2. Specifically, surface 68 is arranged to be secured to rear surface 4 such that hole 70 is at least partially aligned with one or more holes 6. Such alignment allows air flow from vehicle vent 16 to flow through vent adapter 50, hose 40, inlet 66, holes 6, and to the child sitting in car seat 2. In some embodiments, an airtight seal is formed between surface 68 and rear surface 4. Seat adapter 60 may be secured to car seat 2 using any suitable means, for example, bolts, screws, nails, pins, rivets, adhesives, solder, welding, clamps, press or interference fit, etc.

In some embodiments, seat adaptor 60 is a substantially unitary or uniform construction comprising a pliant polymeric material such as, for example, silicone, mixed silicones, polyurethane, latex, rubber, or other suitable polymeric material. Seat adaptor 60 comprising pliant (i.e., able to bend without breaking or able to be manipulated into a predefined space) polymeric construction may be removably secured to car seat rear surface 4 by friction for facile detachment of HVAC device 30. In some embodiments, seat adaptor 60 comprises a soft material (e.g., a pliant polymeric material such as, for example, silicone, mixed silicones, polyurethane, latex, rubber, or other suitable polymeric material) and includes perforations 72 operatively arranged to fold away such as to allow plate 62 to fit securely against car seat rear surface 4, the folded pieces may provide further resistive surfaces for securing seat adaptor 60 to car seat rear surface 4 by frictional attachment, or other securing methods.

As previously stated, HVAC device 30 may further comprise spacer 80 or seal 80. Spacer 80 comprises surface 82, surface 84, and one or more holes 86. Spacer 80 is operatively arranged to connect seat adapter 60 to car seat 2. In some embodiments, surface 82 is connected to rear surface 4 such that one or more holes 86 are at least partially aligned with one or more holes 6. Such alignment allows air flow from vehicle vent 16 to flow through vent adapter 50, hose 40, inlet 66, holes 86, holes 6, and to the child sitting in car seat 2. Spacer 80 may be secured to car seat 2 using any suitable means, for example, bolts, screws, nails, pins, rivets, adhesives, solder, welding, clamps, press or interference fit, etc. Surface 68 is then secured to surface 84 such that hole 70 is at least partially aligned with one or more holes 86 and one or more holes 6. In some embodiments, an air tight seal is formed between rear surface 4, spacer 80, seat adapter 60, hose 40, and vent adapter 50. In some embodiments, the various components of HVAC device 30 need not be air tight.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

2 Car seat
4 Rear surface
6 Hole or holes
8 Seat belt or seat belts
10 Vehicle rear seat
12 Vehicle front seat
14 Vehicle floor
16 Vehicle vent
20 HVAC car seat assembly
30 HVAC device
40 Hose
42 End
44 End
50 Vent adapter
52 Inlet
54 Outlet
56 Adjuster
60 Seat adapter
62 Plate
64 Section
65 Section
66 Inlet
67 Surface
68 Surface
70 Hole
72 Perforations
72A Perforation
72B Perforation
74 Break-away sections
74A Break-away section
74B Break-away section
80 Spacer or seal
82 Surface
84 Surface
86 Holes
S1 Distance
W1 Width
L1 Length

What is claimed is:

1. A seat adapter arranged to be secured to a rear surface of a car seat having one or more holes, the seat adapter comprising:
   a plate, including:
      a first surface arranged to be secured to the rear surface;
      a second surface; and,
      one or more perforations operatively arranged to create one or more breakaway sections;
   a first section extending from the second surface; and,
   a through-hole extending through the plate and the first section, the through-hole arranged to be at least partially aligned with one of the one or more holes.

2. The seat adapter as recited in claim 1, wherein the first section is frusto-conical.

3. The seat adapter as recited in claim 1, wherein the first section forms an inlet and is operatively arranged to be connected to a hose.

4. The seat adapter as recited in claim 1, further comprising a second section extending from the first section.

5. The seat adapter as recited in claim 4, wherein the second section forms an inlet and is operatively arranged to be connected to a hose.

6. The seat adapter as recited in claim 4, wherein the first section is frusto-conical and the second section is cylindrical.

7. The seat adapter as recited in claim 1, wherein the one or more perforations are operatively arranged to allow a width and length to be easily reduced by breaking off the one or more break-away sections along the respective one or more perforations.

8. A HVAC device arranged to direct air flow from a vehicle vent, the HVAC device comprising:
   a seat adapter, including:
      a plate, including:
         a first surface;
         a second surface; and,
         one or more perforations operatively arranged to create one or more breakaway sections;
      a first section extending from the second surface, the first section forming a first inlet; and,
      a through-hole extending through the plate and the first section;
   a hose including a first end connected to the inlet and a second end; and,
   a vent adapter including a second inlet operatively arranged to be secured to the vehicle vent and an outlet connected to the second end.

9. The HVAC device as recited in claim 8, wherein the first section is frusto-conical.

10. The HVAC device as recited in claim 8, wherein the first section comprises a frusto-conical section and a cylindrical section.

11. The HVAC device as recited in claim 8, wherein the one or more perforations are operatively arranged to allow a width and length to be easily reduced by breaking off the one or more break-away sections along the respective one or more perforations.

12. The HVAC device as recited in claim 8, wherein the second inlet comprises an adjuster operatively arranged to reduce a size of the second inlet.

13. The HVAC device as recited in claim 8, wherein the vent adapter comprises a flexible material.

14. The HVAC device as recited in claim 8, further comprising a spacer connected to the first surface and having one or more holes, wherein the through-hole is arranged to be at least partially aligned with at least one of the one or more holes.

15. The HVAC device as recited in claim 8, further comprising a car seat, the car seat including:
   a rear surface; and,
   one or more seat belt holes.

16. The HVAC device as recited in claim 15, wherein the first surface is arranged to be connected to the rear surface.

17. The HVAC device as recited in claim 16, wherein the through-hole is arranged to be at least partially aligned with the one or more seat belt holes.

18. The HVAC device as recited in claim 8, wherein the first section is cylindrical.

19. A HVAC device arranged to direct air flow from a vehicle vent, the HVAC device comprising:
   a car seat comprising a rear surface including one or more holes;
   a seat adapter, comprising:
      a plate, including:
         a first surface arranged to be secured to the rear surface;
         a second surface; and,
         one or more perforations operatively arranged to create one or more breakaway sections;
      a first section extending from the second surface, the first section forming a first inlet; and,
      a through-hole extending through the plate and the first section, the through-hole arranged to be at least partially aligned with one of the one or more holes;
   a hose including a first end connected to the inlet and a second end; and,
   a vent adapter including a second inlet operatively arranged to be secured to the vehicle vent and an outlet connected to the second end.

20. The HVAC device as recited in claim 19, wherein the one or more perforations are operatively arranged to allow a width and length to be easily reduced by breaking off the one or more break-away sections along the respective one or more perforations.

* * * * *